(12) United States Patent
Fukuda (10) Patent No.: US 7,679,789 B2
(45) Date of Patent: Mar. 16, 2010

(54) FACSIMILE APPARATUS AND MULTIFUNCTIONAL PRINTER

(75) Inventor: Hikaru Fukuda, Tochigi (JP)

(73) Assignee: Panasonic Corporation, Osaka (JP)

( * ) Notice: Subject to any disclaimer, the term of this patent is extended or adjusted under 35 U.S.C. 154(b) by 1522 days.

(21) Appl. No.: 10/770,492

(22) Filed: Feb. 4, 2004

(65) Prior Publication Data

US 2004/0165220 A1 Aug. 26, 2004

(30) Foreign Application Priority Data

Feb. 20, 2003 (JP) ............................. 2003-042363

(51) Int. Cl.
*H04N 1/00* (2006.01)
*H04M 11/00* (2006.01)
(52) U.S. Cl. ...................... 358/400; 358/404; 358/408; 358/440; 358/441; 358/444; 358/434; 358/468; 358/1.15; 379/100.01; 379/88.13
(58) Field of Classification Search ............... 358/1.15, 358/400, 404, 408, 441, 444, 434, 468, 440, 358/403, 461, 443, 453, 450, 438, 407, 439, 358/470, 1.13; 382/209, 284, 321, 173; 399/382, 404, 388, 43; 379/88.13, 375.01, 379/100.01

See application file for complete search history.

(56) References Cited

U.S. PATENT DOCUMENTS

| 4,259,548 A | * | 3/1981 | Fahey et al. ................... 379/38 |
| 4,811,111 A | | 3/1989 | Kurokawa |
| 5,262,851 A | * | 11/1993 | Nakatani et al. ............. 358/500 |
| 5,307,179 A | * | 4/1994 | Yoshida ........................ 358/440 |
| 5,412,710 A | * | 5/1995 | Tanaka ..................... 379/88.13 |
| 5,509,067 A | | 4/1996 | Murata |
| 5,513,013 A | * | 4/1996 | Kuo ............................. 358/448 |
| 5,668,640 A | * | 9/1997 | Nozawa et al. .............. 358/434 |
| 5,886,699 A | | 3/1999 | Belfiore et al. |
| 6,101,329 A | * | 8/2000 | Graef .......................... 710/52 |
| 6,700,674 B1 | * | 3/2004 | Otsuka et al. .............. 358/1.15 |

(Continued)

FOREIGN PATENT DOCUMENTS

EP 0325991 8/1989

(Continued)

OTHER PUBLICATIONS

English Language Abstract of JP 2-141172.

(Continued)

*Primary Examiner*—King Y Poon
*Assistant Examiner*—Steven Kau
(74) *Attorney, Agent, or Firm*—Greenblum & Bernstein P.L.C.

(57) ABSTRACT

Individual destination information is registered into each character/symbol input key on an operation panel. Upon transmitting data, one of the registered character/symbol input keys is pressed to select a destination. In addition to character/symbol input keys, it is possible to register destinations into selection keys. When one of the selection keys having been pre-assigned for a predetermined operation is chosen for a registration, the registration of the key is denied. The registered destination information can be printed out, by a recorder, as a destination list that associates key names and destination names. The destination information can be displayed on a screen by a display, after a retrieval process based on a specified search condition.

6 Claims, 9 Drawing Sheets

U.S. PATENT DOCUMENTS

| | | |
|---|---|---|
| 7,313,699 B2 | 12/2007 | Koga |
| 2002/0048051 A1 | 4/2002 | Momonami et al. |
| 2003/0188018 A1* | 10/2003 | Guerrero et al. ............ 709/242 |
| 2008/0005781 A1 | 1/2008 | Koga |

FOREIGN PATENT DOCUMENTS

| | | | |
|---|---|---|---|
| JP | 62-163449 | * | 7/1987 |
| JP | 2-141172 | | 5/1990 |
| JP | 7-107260 | | 4/1995 |
| JP | 10-055222 A | | 2/1998 |
| JP | 2002-236577 A | | 8/2002 |

OTHER PUBLICATIONS

English Language Abstract of JP 7-107260.
English language Abstract of JP 2002-236577 A.
English language Abstract of JP 10-055222 A.

* cited by examiner

| destination name | dialing number | e-mail address |
|---|---|---|
| America | 123-4567-8888 | America@abcde.com |
| Belgium | +32-222-3456-7890 | Belgium@abcde.com |
| Canada | 323-4567-9999 | Canada@abcde.com |
| Denmark | +45-444-5678-9012 | Denmark@abcde.com |
| Australia | +61-555-6789-0123 | Australia@abcde.com |
| Austria | +43-666-7890-1234 | Austria@abcde.com |
| | | |
| Zambia | +260-999-1234-5678 | Zambia@abcde.com |

FACSIMILE APPARATUS AND MULTIFUNCTIONAL PRINTER

BACKGROUND OF THE INVENTION

1. Field of the Invention

This invention relates to a facsimile apparatus and a multifunctional printer that has a so-called shortcut key function enabling a simple key operation to select a destination of transmitting data.

2. Description of Related Art

Conventionally, a facsimile apparatus with a destination memory function that stores destination dialing numbers usually has shortcut keys aligned on an operation panel, so that the user can individually register each destination associating with a shortcut key. When one of the registered shortcut keys is pressed for data transmission, the destination dialing number corresponding to the shortcut key is called in order to transmit the facsimile data.

Facsimile apparatuses having such a shortcut key function sometimes have a configuration provided for destination labels describing destination names for the corresponding shortcut keys. Such configuration improves usability of the apparatus, making it possible to associate the shortcut keys with destinations. Further, some apparatuses further provide a function to print the destination labels using the destination names stored in the apparatuses (Prior Art 1), thereby eliminating the bother of creating destination labels by hand.

Prior Art 1: Patent Laid Open Application H02-141172

However, the above-described conventional facsimile apparatuses must have operation panels of large dimensions, due to numerous shortcut keys provided on the panels. The size of the operation panel can be reduced to some degree, by decreasing the size of the destination labels. However, the size can only be reduced to a certain degree, because the size of the characters used for the destination labels must stay legible. Further, when the number of shortcut keys is increased for convenience, it in fact takes longer to read the labels and find a shortcut key corresponding to the desired destination, thereby impairing the usability.

SUMMARY OF THE INVENTION

This invention addresses the above-described problem. The purpose of the invention is to provide a facsimile apparatus and a multifunctional printer that do not require the operation panel to be enlarged due to the presence of the shortcut keys, making it easy to find a key corresponding to a desired destination even when the number of registered destinations are increased.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
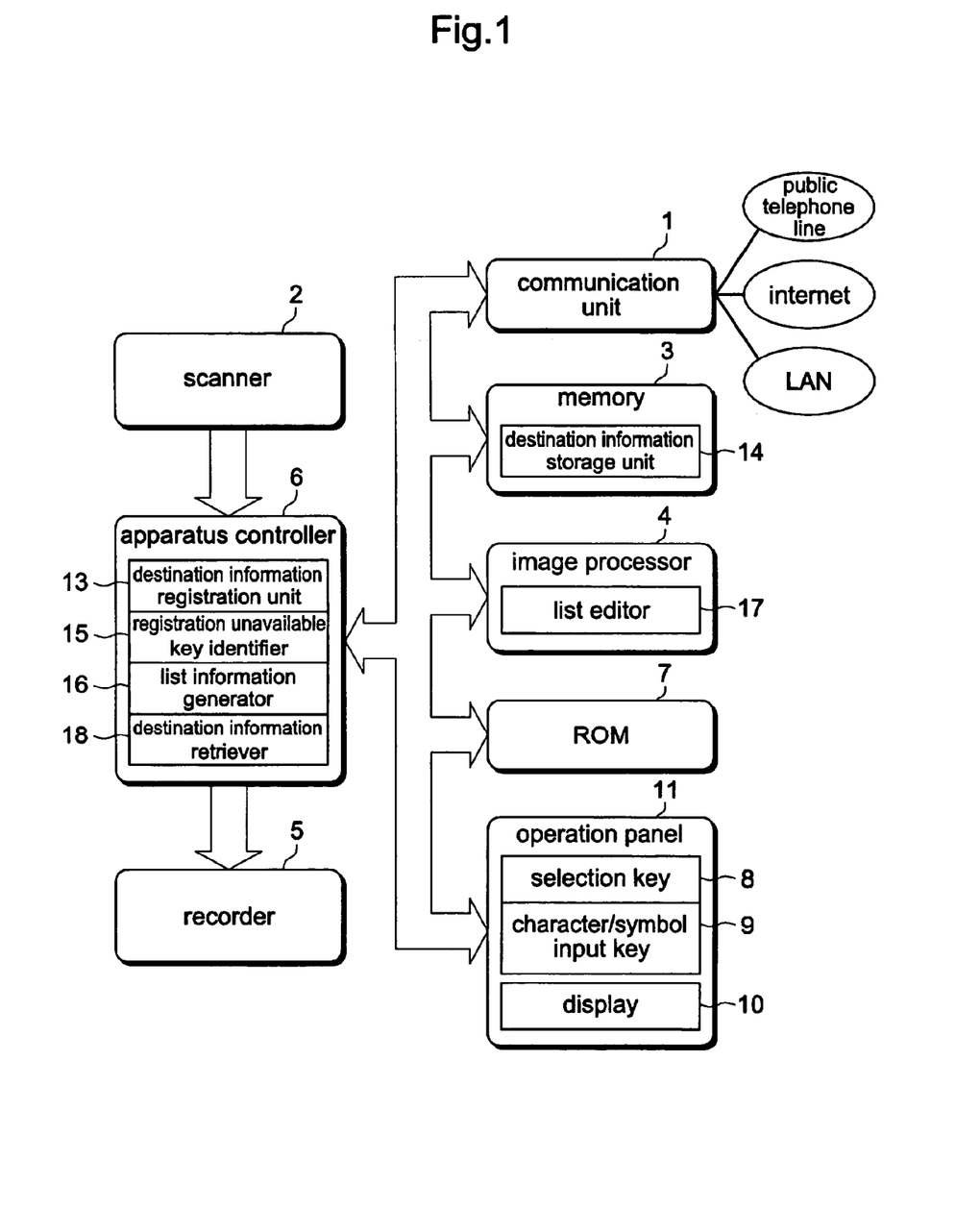
FIG. 1 is a block diagram illustrating a schematic configuration of a multifunctional printer according to an embodiment of the invention.

FIG. 1 is a block diagram illustrating a schematic configuration of a multifunctional printer according to an embodiment of the invention. The multifunctional printer is provided with communication unit 1 that exchanges image information with an external apparatus, scanner 2 that scans a document image, memory 3 that stores image information and apparatus setup information, image processor 4 that processes images (image generation/reduction/rotation) using the image information and generates a report, recorder 5 that prints out the image information, apparatus controller 6 that controls an operation of each unit, ROM 7 that stores a program needed for the control, selection key 8 that selects and indicates an execution of a process and a setting of such a process, character/symbol input key 9 that for inputting various types of information, display 10 that displays an apparatus status and registration information, and operation panel 11 having display 10.

In addition to a facsimile function, the multifunctional printer is provided with copier, printer, and scanner functions. The facsimile function is employed when communicator 1 transmits scanned image information generated by scanner 2, or when recorder 5 outputs received image information received by communicator 1. The copier function is employed when recorder 5 outputs scanned image information generated by scanner 2. The printer function is employed when recorder 5 outputs received image information transmitted from a PC via LAN. The scanner function is employed when scanned image information generated by scanner 2 is transmitted to a PC via LAN.

The multifunctional printer also includes destination information registration unit 13 that individually registers destination information into each key on operation panel 11, so that upon transmitting data, destination can be specified from a registered key. The destination information is stored in destination information storage unit 14 within memory 3, so that when a key is pressed for transmission, destination information corresponding to the key is retrieved from destination information storage unit 14, in order to enable communicator 1 to transmit data. The destination information registration unit 13 is able to register destination information in English characters.

Figure 2:
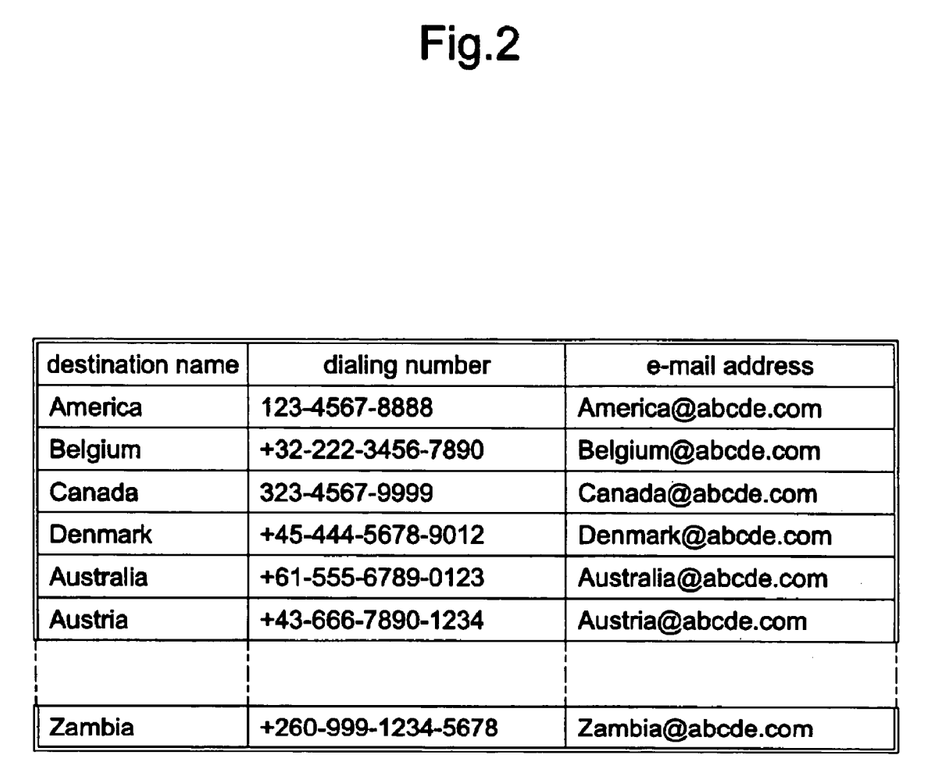
FIG. 2 illustrates contents of destination information registered by a destination information registration unit of FIG. 1.

FIG. 2 illustrates contents of destination information registered by the destination information registration unit of FIG. 1. In this embodiment, registering destination information includes a destination name, dialing number, and e-mail address. The dialing number is used for a G3 facsimile transmission, whereas the e-mail address is used for a so-called Internet facsimile transmission that transmits image information in an e-mail method. The destination information is registered using ASCII characters. When there is no registration, NULL (00) is used. In addition, the destination information is registered in association with a corresponding name of registering key (identifying information), and stored in the destination information storage unit together with information that associates the information with the key name.

Figure 3:
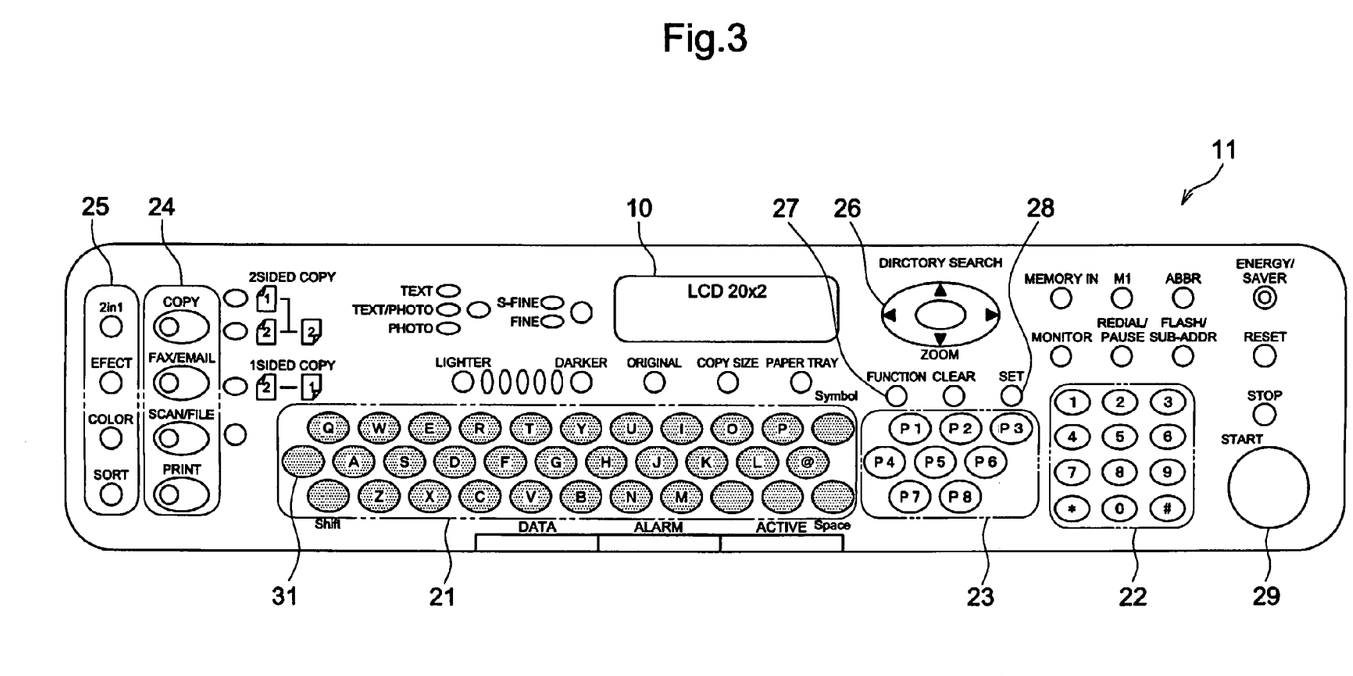
FIG. 3 is a front external view of an operation panel of FIG. 1.

FIG. 3 is a front external view of the operation panel of FIG. 1. Operation panel 11 is provided with character/symbol input keys including a plurality of English character input keys (A-Z) arranged according to the QWERTY layout (commonly used English character layout) and numeric character input keys (0-9) arranged according to the commonly used dial key layout.

In particular, the English character input keys (A-Z) having 21 input keys are arranged into three rows according to the QWERTY layout. Numeric input keys (0-9) of dial keys 22 and symbol input keys ("*" and "#") are arranged in accordance with the commonly used dial key layout (a plurality of keys being arranged in a crisscross layout). Also, programs keys (P1-P8) allow registrations of certain necessary operations and dialing numbers.

Additionally, operation panel 11 includes function selection keys 24 that selects a function from copier, printer, scanner and facsimile functions, setup selection keys 25 that select setups of various processes, directory search key 26 that has a multi-cursor type key (with up-down-right-left indicators), function key 27, set key 28, and start key 29. Display 10 is provided in the mid section of operation panel 11. A 2-in-1 key within setup selection keys 25 can specify a 2-in-1 process that records data of 2 sheets into 1 sheet, during the recording onto a recording paper. Also, within setup selection keys 25, an effect key can specify a predetermined image process on image information, a color key can specify a color scanning process of a document, and sort key can specify a page sorting process.

Figure 4:
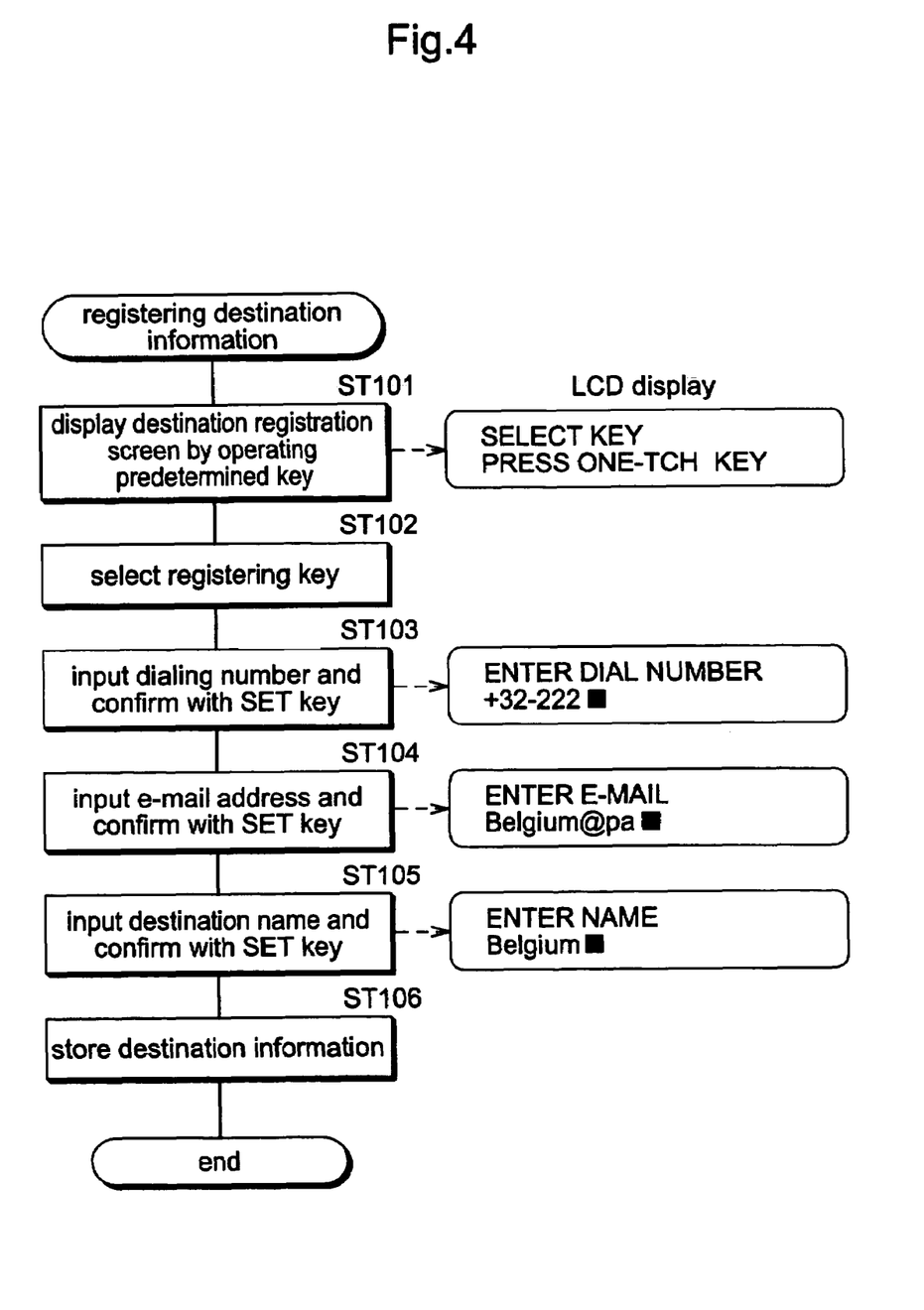
FIG. 4 is a flowchart illustrating steps for the destination information registration unit of FIG. 1 to register destination information.

FIG. 4 is a flowchart illustrating steps for the destination information registration unit of FIG. 1 to register destination information. In this example, keys that can be registered are limited to character/symbol input keys. According to a predetermined procedure, registering keys are identified and destination information is input. First, a destination registration screen is displayed by pressing a predetermined key on operation panel 11 (e.g., function key 27 and a predetermined numeric input key) (step 101). When a screen prompting a selection of a registering key is displayed on display 10, a registering key can be selected (step 102). Then, a screen prompting an input of dialing number is displayed. When a dialing number is input from the numeric input keys, and set key 28 is pressed, the dialing number is confirmed (step 103). Subsequently, a screen prompting an e-mail address input is displayed. When an e-mail address is input from the character/symbol input keys and confirmed with set key 28 (step 104), another screen prompting an input of destination name is displayed. When a destination name is input from the character/symbol input keys and confirmed with set key 28 (step 105), destination information registration unit 13 stores, in memory 3, the destination information, including the dialing number, e-mail address, and destination name (step 106).

Further, as shown in FIG. 1, the multifunctional printer according to the invention is provided with registration unavailable key identifier 15 that rejects registration of a key, when the key, being selected for a registration by destination information registration unit 13, has already been assigned to a predetermined transmission operation, in a situation where the keys that can be registered are not limited to the character/symbol input keys. Examples of keys that can be registered, within selection keys 8 (keys having functions to execute a predetermined process and to select a setup of the process), are a program key, 2-in-1 key, effect key, and sort key that are not associated with the transmission process.

Figure 5:
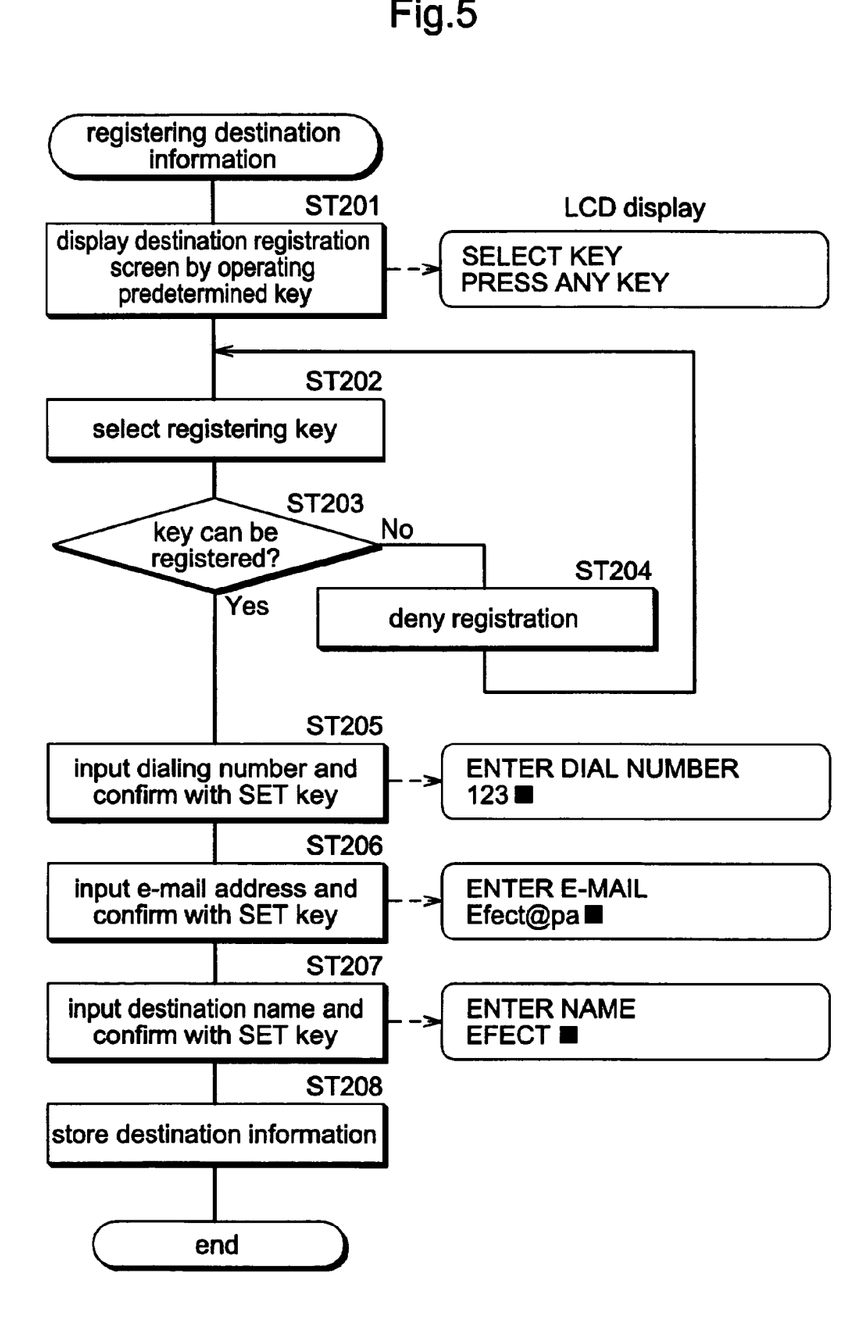
FIG. 5 is another flowchart illustrating steps for the destination information registration unit of FIG. 1 to register destination information.

FIG. 5 is another flowchart illustrating steps for the destination information registration unit of FIG. 1 to register destination information. In this example, keys that can be registered are not limited to character/symbol input keys. In this example, it is determined whether the selected key can be registered, after selecting a registering key. First, the destination registration screen is displayed by pressing a predetermined key on operation panel 11 (step 201). When a registering key is selected (step 202), registration unavailable key identifier 15 determines whether the selected key can be registered (step 203). When the key cannot be registered, the registration is denied and an alarm sound is output to notify the operator of the same (step 204). Then, the control returns to the key selection. When it is determined that the selected key can be registered, procedures for inputting a dialing number (step 205), inputting an e-mail address (step 206), and inputting a destination name (step 207) are sequentially performed similar to the flowchart illustrated in FIG. 4. Then, the destination information is stored in memory 3 (step 208).

In addition, the multifunctional printer according to the invention is provided with list information generator 16 that generates destination list information matching a key name and a destination name, based on the destination information registered by destination information registration unit 13. Recorder 5 prints destination information generated by list information generator 16. List information generator 16 sorts data in a predetermined order, based on names of registered keys. For example, when the destination information is in English characters, the list is sorted in the English alphabet order. When the destination information is in Japanese Kana characters, the list is sorted in the Japanese Kana alphabet order. When sorting, destination list information is generated by grouping the registered keys into English character input key groups and dial key groups, for example. Such destination list information is edited into a predetermined destination list format by list editor 17 of image processor 4.

Figure 6:
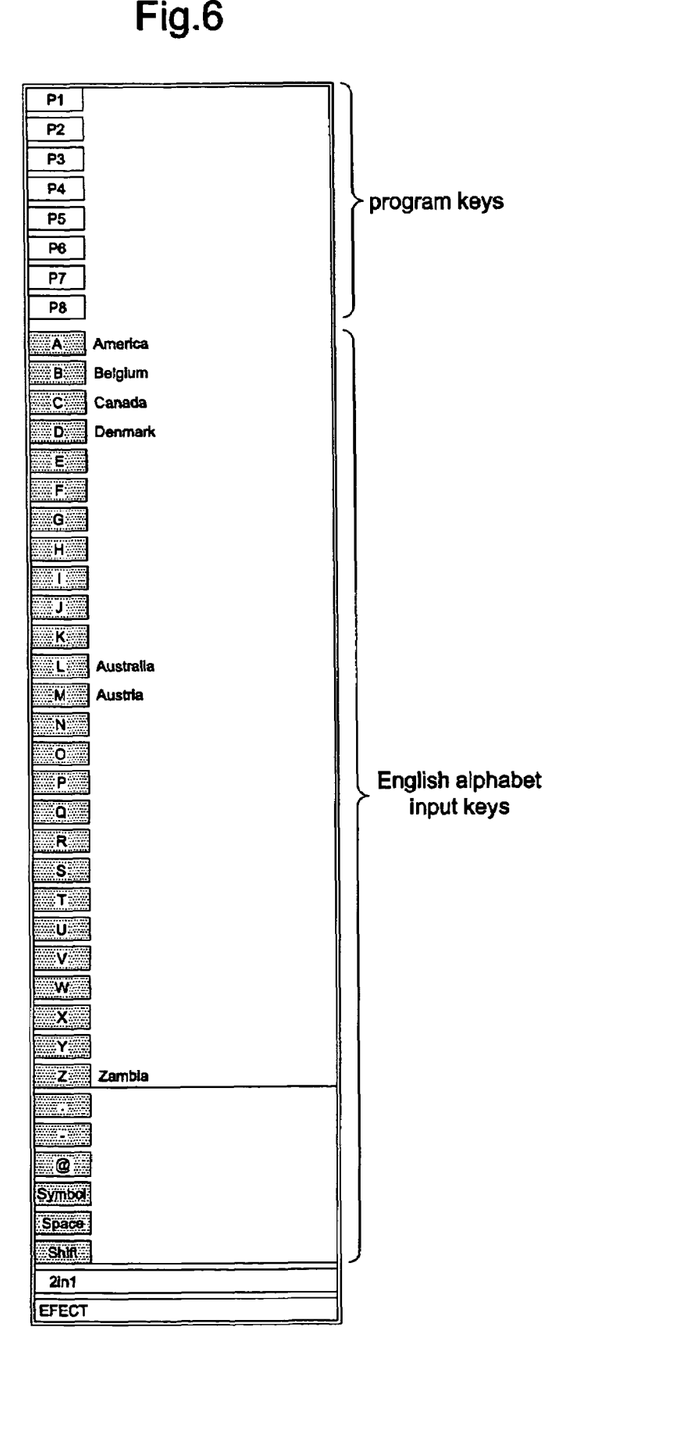
FIG. 6 illustrates an example of a destination list printed by a recorder of FIG. 1.

FIG. 6 illustrates an example of a destination list printed by the recorder of FIG. 1. This example shows a situation where destination information is registered in an English character registration mode, having a list of keys that can be registered and a list of pre-registered destination names. The list is sorted in the alphabet order, with destination names in English alphabet order, corresponding to the English character input keys (A-Z). In addition to the above, program keys (P1-P8), English symbol input keys (".", "-", and "@"), additional symbol input key, space input key, shift key, 2-in-1 key, and effect key can be registered. Therefore, destination names corresponding to such keys can be printed at the same time. Additionally, the destination names can be sorted and viewed in the alphabet order, based on their English spelling.

Figure 7:
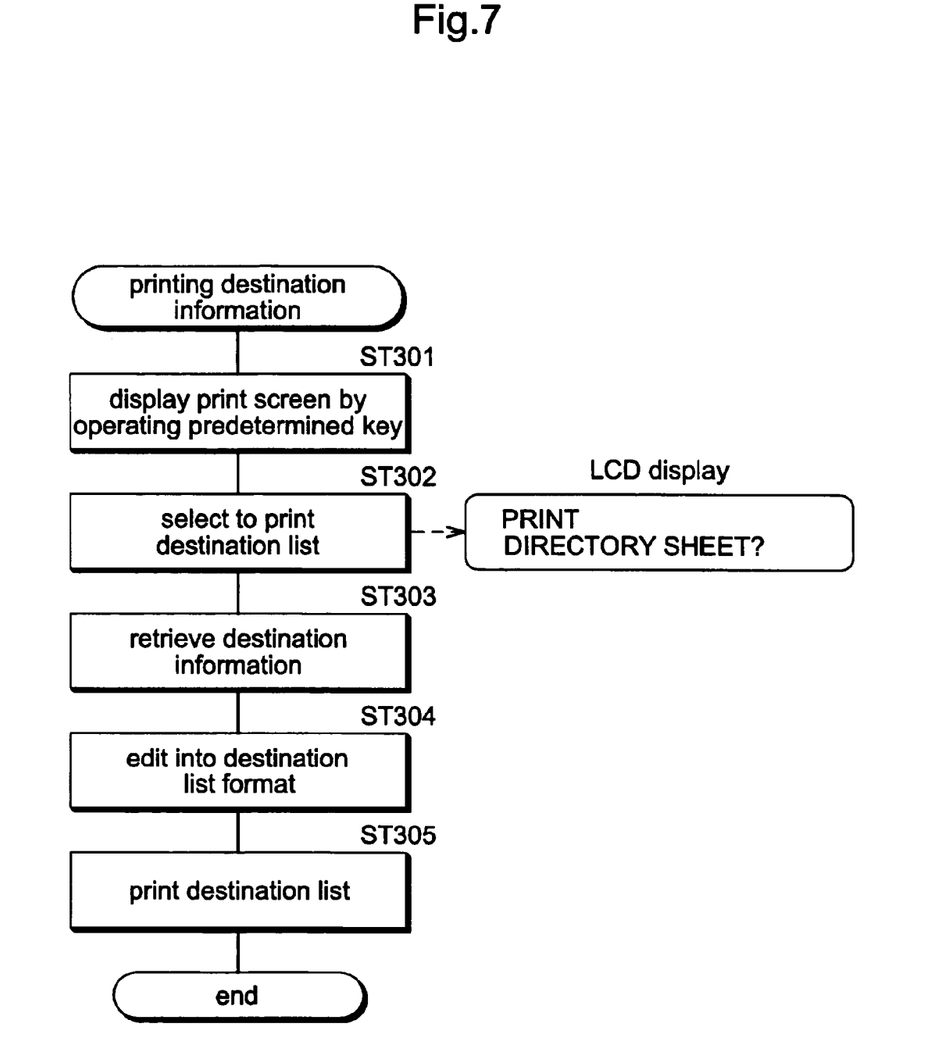
FIG. 7 is a flowchart illustrating steps of printing the destination information registered by the destination information registration unit of FIG. 1.

FIG. 7 is a flowchart illustrating steps of printing the destination information registered by the destination information registration unit of FIG. 1. First, when predetermined keys on operation panel 11 (e.g., function key 27 and a numeric input key) are pressed, a menu screen for printing process is displayed (step 301). When destination list printing is selected, a confirmation screen is displayed on display 10. When the selection is confirmed from set key 28 (step 302), list information generator 16 searches destination information storage unit 14 for the destination information, and retrieves destination list information (step 303). Subsequently, list editor 17 of image processor 4 edits the destination list information into a predetermined destination list format (step 304). Then, recorder 5 prints the generated destination list (step 305).

Figure 8:
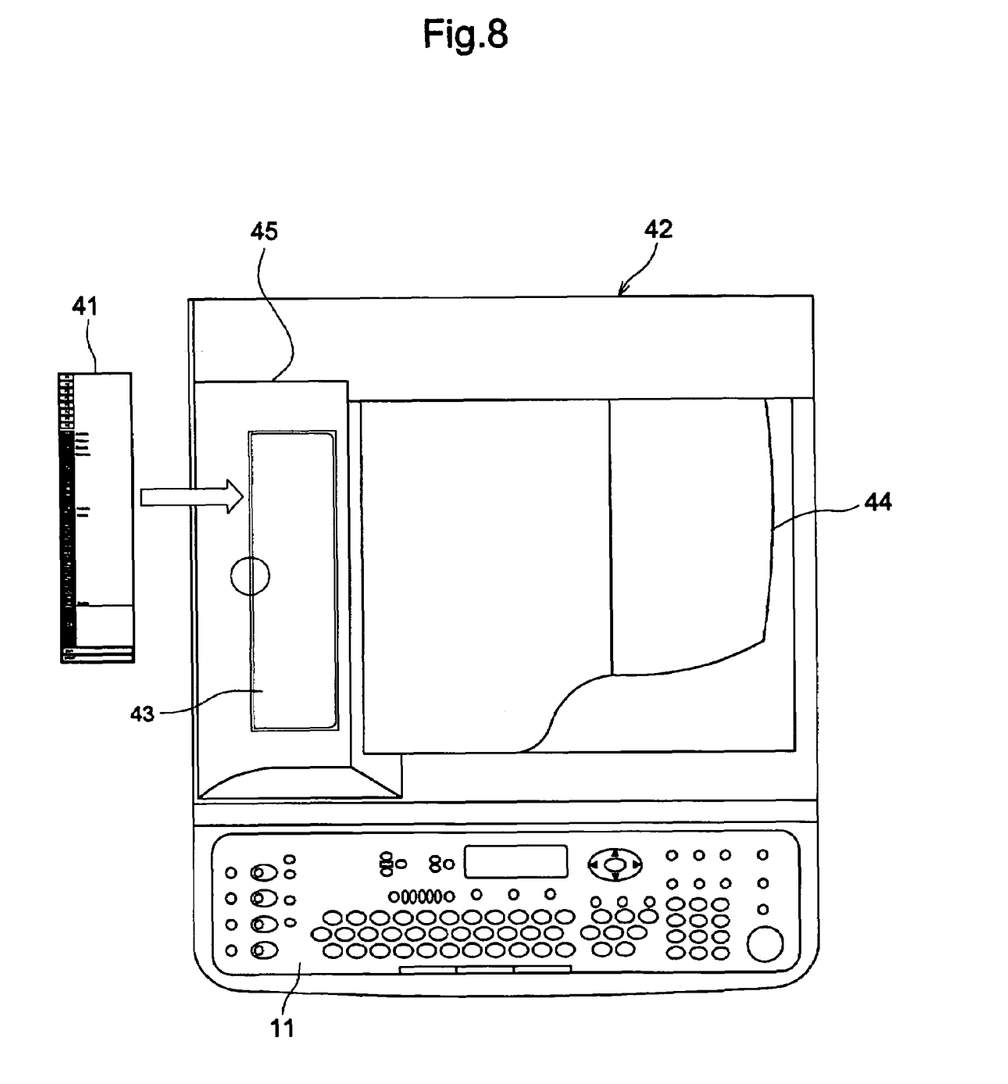
FIG. 8 is a top plane view illustrating an external view of the multifunctional printer of FIG. 1.

FIG. 8 is a top plane view illustrating an external view of the multifunctional printer of FIG. 1. The multifunctional printer according to the invention is provided with case 42 that has a prearranged space for installing destination list sheet 41, on which recorder 5 has printed the destination list information. Especially in this embodiment, sheet folder 43 that houses destination list sheet 41 is provided on the top surface of housing 45 of document feeder, the feeder housing a feeder roller that feeds a document (on document feeder tray 44) to be scanned by a sensor. This folder 43 allows the operator of operation panel 11 to easily view destination list sheet 41. Sheet folder 43 is provided with an openable-and-closable transparent faceplate that covers the front side of destination list sheet 41. As an alternative, a space for destination list sheet 41 can be simply provided on the surface of housing 45, so that an adhesive sheet (on which the destination list information is printed) can be pasted on the surface.

Upon transmitting a facsimile data using the multifunctional printer, a facsimile key within the function selection keys of the operation panel is pressed to activate a facsimile transmission mode. Similar to a conventional speed dial method, a destination can be selected by pressing a necessary key into which a destination is registered (e.g., English character input key). Then, a screen confirming the destination is displayed. When the destination is correct, a document is set on the scanner and start key is pressed, in order to transmit the document image to the desired destination.

Furthermore, as shown in FIG. 1, the multifunctional printer according to the invention is provided with destination information retriever 18 that retrieves destination information based on a search condition specified from operation panel 11. The search result can be displayed on display 10 so that the destination can be confirmed from the display. In this embodiment, destination information retriever 18 retrieves destination information stored in destination information storage unit 14 in order to conduct the search with a character string of a destination name as a search condition. The operator inputs a first letter of the character string of the desired destination from a key on operation panel 11.

In this example, destination names that are displayed on the screen are scrollable according to the operation of operation panel 11. In particular, when destination information retriever 18 retrieves destination information that matches with the search condition, the destination name is displayed on display 10 on every line (per destination). When there are a plurality of matching destinations, the screen can be scrolled to view the following destination. In this embodiment, the destination information is sorted in to a predetermined order, similar to generating the destination list information by list information generator 16. Therefore, the destination names matching the search condition are also displayed in the above order.

As described above, destination information registration unit 13 can register destination information in English characters. Therefore, upon searching destination information, the search condition can be specified from the keys in English. When destination information is registered in English character registration mode, and a search letter is input from an English character input key, destination names in English characters are retrieved.

Figure 9:
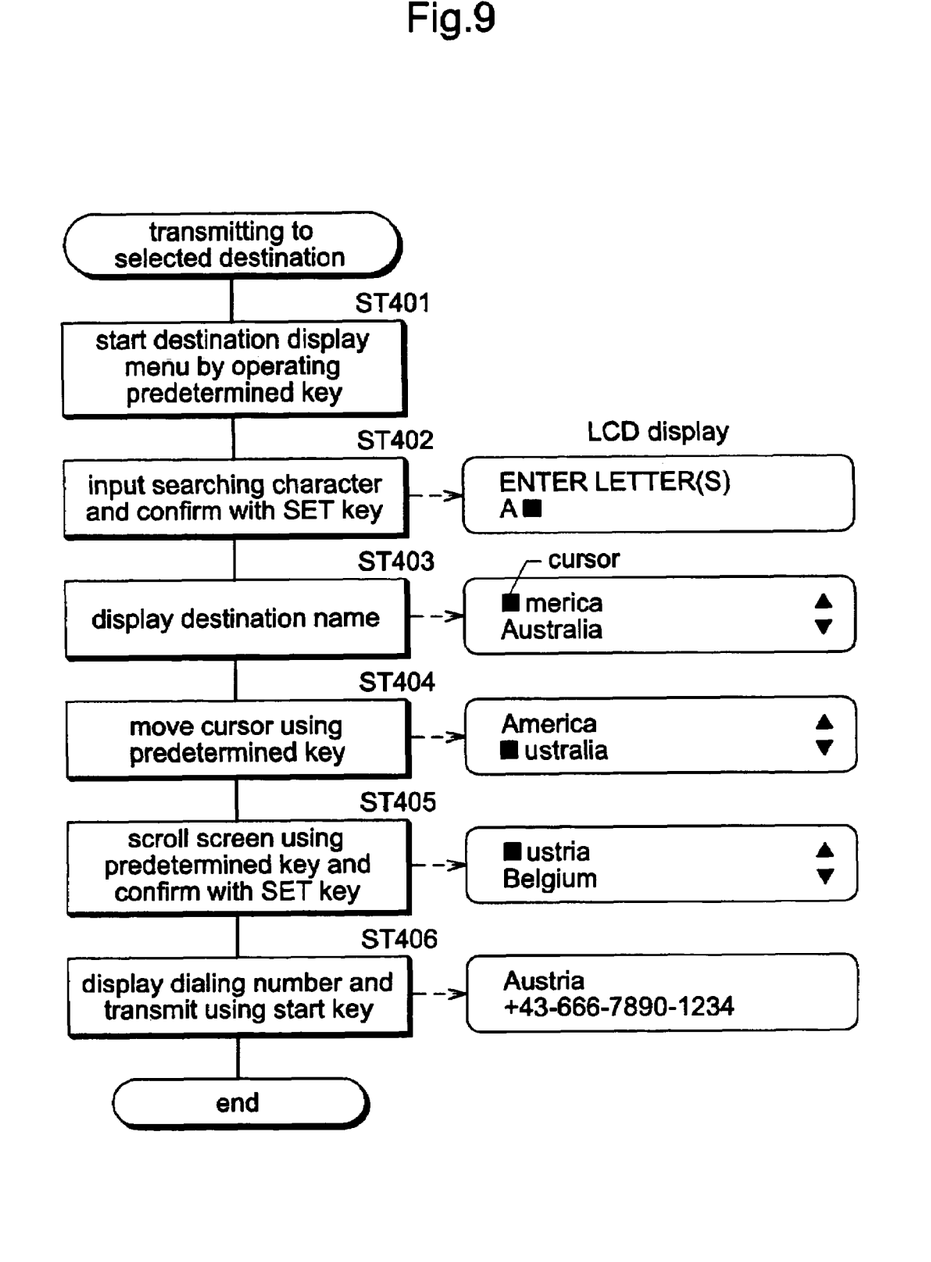
FIG. 9 is a flowchart illustrating steps for the multifunctional printer of FIG. 1 to transmit data to a selected destination.

FIG. 9 is a flowchart illustrating steps for the multifunctional printer of FIG. 1 to transmit data to a selected destination. In this embodiment, destination information is registered in English characters. First, when a predetermined key on operation panel 11 (e.g., directory search key 26) is pressed, a destination display menu is activated (step 401). When display 10 displays a screen prompting an input of an initial character of a destination name, the search character is input from an English character input key, so that set key 28 can be pressed for confirmation (step 402). Then, destination information retriever 18 performs a retrieval process based on the input search character, and the destination name is displayed on display 10 (step 403). When a down key from directory search key 26 is pressed, a blinking cursor moves down (step 404). When the down key is pressed again, the screen is scrolled to show the next destination name. When the cursor is pointing a correct destination name, set key 28 is pressed to confirm the destination (step 405). Then, the dialing number is displayed on display 10. When a document is set in scanner 2 and start key 29 is pressed, the document image information is transmitted to the selected destination (step 406). Further, in case of selecting a plurality of destinations, the control can move from step 405 to step 401 by a predetermined operation.

In this embodiment, the explanation was made with regards to a multifunctional printer. However, the invention can be applied to a facsimile apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2003-042363 filed on Feb. 20, 2003, entire content of which is expressly incorporated by reference herein.

What is claimed is:

1. A facsimile apparatus comprising:
    an operation panel having a plurality of keys, including symbol input keys by which data relating to symbols can be input and function keys by which an apparatus function can be selected to be performed, the keys being arranged in a predetermined order, the function keys comprising transmission function keys assigned to perform a predetermined transmission process and non-transmission function keys assigned to perform a predetermined non-transmission function on input data;
    a destination information registration unit that individually stores destination information into at least one symbol input key or function key on said operation panel; and
    a registration unavailable identifier that denies storage of destination information in a selected key when said key selected for the storage of destination information by said destination information registration unit comprises one of the transmission function keys that has been assigned to perform a predetermined transmission process and that accepts storage of destination information in a selected key when said key selected for the storage of destination information by said destination information registration unit comprises one of the non-transmission function keys, said registration unavailable identifier determining whether to accept or deny storage of destination information based upon whether said selected key is one of said transmission function keys or one of said non-transmission function keys;

wherein, when a non-transmission function key in which destination information is stored is operated, in a facsimile transmission mode, a destination to which data is transmitted by facsimile transmission is specified.

2. The facsimile apparatus according to claim 1, further comprising:
   a list information generator that generates destination list information associating a name of the key and a destination name, based on the destination information stored by said destination information registration unit, wherein the generated destination list information is printed by a recorder.

3. The facsimile apparatus according to claim 2, further comprising:
   a case having a prearranged space for installing a sheet, on which the recorder has printed the destination list information.

4. The facsimile apparatus according to claim 1, further comprising:
   a destination information retriever that retrieves destination information based on a search condition specified by an operation of said operation panel,
   wherein the search result is displayed on a screen by a display unit.

5. The facsimile apparatus according to claim 4, wherein destination names displayed on the screen are scrollable according to an operation of said operation panel.

6. The facsimile apparatus according to claim 1, the registration unavailable identifier being further configured to issue an alarm, when the selected key is determined to be a transmission function key.

* * * * *